United States Patent [19]

Cholovich

[11] Patent Number: 4,940,371
[45] Date of Patent: Jul. 10, 1990

[54] TRAILER LOCK DOWN DEVICE

[76] Inventor: George M. Cholovich, 262 Ben Putnam Rd., SW., Resaca, Ga. 30735

[21] Appl. No.: 381,807

[22] Filed: Jul. 19, 1989

[51] Int. Cl.$^5$ .............................................. B60D 1/00
[52] U.S. Cl. .................................... 410/101; 280/507
[58] Field of Search .................. 410/101, 120; 52/698, 52/699; 280/507; 248/553, 551; 254/93 R, 93 VA, 420, 423

[56] References Cited

U.S. PATENT DOCUMENTS

| | | | |
|---|---|---|---|
| 1,264,189 | 4/1918 | Keator | 52/699 |
| 2,885,181 | 5/1959 | McCully et al. | 254/420 |
| 3,884,055 | 5/1975 | Vuillemot | 280/507 |
| 3,937,437 | 2/1976 | Stewart . | |
| 4,074,519 | 2/1978 | Garrett . | |
| 4,309,138 | 1/1982 | Jarman et al. | 254/93 R |
| 4,487,537 | 12/1984 | Morse . | |
| 4,592,686 | 6/1986 | Andrews . | |
| 4,630,982 | 12/1986 | Fenner . | |

Primary Examiner—Andres Kashnikow
Assistant Examiner—Virna Lissi Mojica
Attorney, Agent, or Firm—Jerry T. Kearns

[57] ABSTRACT

A trailer lock down device includes a base secured to a ground insertion anchor adapted for encapsulation in a concrete block. A hydraulic jack on the base mounts a shaft for selective vertical extension and retraction. A threaded extension member is telescopically received in coaxial relation in a free upper end of the shaft and has an upper end secured to a first L-shaped member. A second L-shaped member is secured by a hinge to the first L-shaped member and is movable to a closed position to form an open ended box. A key actuated locking mechanism secures the second L-shaped member in a closed position to lock a trailer in a selected location.

1 Claim, 3 Drawing Sheets

TRAILER LOCK DOWN DEVICE

BACKGROUND OF THE INVENTION

1. Field of the Invention

The present invention relates to lock down devices, and more particularly pertains to a trailer lock down device for securing trailers such as a boat trailer, a utility trailer or a travel trailer in a selected location. These forms of trailers must frequently be left unattended in a particular location. Additionally, it is desirable to maintain these trailers in a level orientation when parked. Frequently, these trailers have a relatively large amount of tongue weight which makes it difficult to lift the trailer tongue for mounting on a vehicle. In order to overcome these problems, the present invention provides a trailer lock down device including a hydraulic jack for moving the trailer tongue to a level position.

2. Description of the Prior Art

Various types of lock down devices are known in the prior art. A typical example of such a lock down device is to be found in U.S. Pat. No. 3,937,437, which issued to N. Stewart on Feb. 10, 1976. This patent discloses an anchoring apparatus for use in anchoring structures to the ground by use of elongated flexible straps. The anchoring apparatus has a lower ground engaging portion which is embedded in the ground below ground level. U.S. Pat. No. 4,074,519, which issued to C. Garrett on Feb. 21, 1978, discloses a swivel shackle for connection to a tension member, whereby a force can be applied in any direction within a hemisphere centered about an attachment point. U.S. Pat. No. 4,487,537, which issued to H. Morse on Dec. 11, 1984, discloses a drum tie-down apparatus for securing containers in an upright position to a floor or platform of a transportation vehicle. U.S. Pat. No. 4,592,686, which issued to G. Andrews on June 3, 1986, discloses a tie-down swivel including a cooperating bushing and stud to transfer variable loadings to a base. U.S. Pat. No. 4,630,982, which issued to J. Fenner on Dec. 23, 1986, discloses a cargo tie-down system in which a receptacle having a socket is incorporated into a floor of a vehicle cargo department.

While the above mentioned devices are directed to lock down devices, none of these devices disclose a trailer lock down device which utilizes a hydraulic jack to secure the tongue of a trailer in a level position. Additional features of the present invention, not contemplated by the aforesaid prior art devices include the provision of an open ended locking box formed by two hingedly connected L-shaped members secured to a vertically adjustable shaft, the use of an elongated ground insertion anchor encapsulated in a concrete block and including a plurality of axially spaced radially extending flanges, and the use of a telescopic threaded extension member to provide a wide range of adjustment. Inasmuch as the art is relatively crowded with respect to these various types of lock down devices, it can be appreciated that there is a continuing need for and interest in improvements to such lock down devices, and in this respect, the present invention addresses this need and interest.

SUMMARY OF THE INVENTION

In view of the foregoing disadvantages inherent in the known types of lock down devices now present in the prior art, the present invention provides an improved trailer lock down device. As such, the general purpose of the present invention, which will be described subsequently in greater detail, is to provide a new and improved trailer lock down device which has all the advantages of the prior art lock down devices and none of the disadvantages.

To attain this, a representative embodiment of the concepts of the present invention is illustrated in the drawings and makes use of a trailer lock down device which includes a base secured to a ground insertion anchor adapted for encapsulation in a concrete block. A hydraulic jack on the base mounts a shaft for selective vertical extension and retraction. A threaded extension member is telescopically received in coaxial relation in a free upper end of the shaft and has an upper end secured to a first L-shaped member. A second L-shaped member is secured by a hinge to the first L-shaped member and is movable to a closed position to form an open ended box. A key actuated locking mechanism secures the second L-shaped member in a closed position to lock a trailer in a selected location.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseologY, to determine quickly from a cursory inspection the nature and essence of the technical disclosure of the application. The abstract is neither intended to define the invention of the application, which is measured by the claims, nor is it intended to be limiting as to the scope of the invention in any way It is therefore an object of the present invention to provide a new and improved trailer lock down device which has all the advantages of the prior art lock down devices and none of the disadvantages.

It is another object of the present invention to provide a new and improved trailer lock down device which may be easily and efficiently manufactured and marketed.

It is a further object of the present invention to provide a new and improved trailer lock down device which is of a durable and reliable construction.

An even further object of the present invention is to provide a new and improved trailer lock down device which is susceptible of a low cost of manufacture with regard to both materials and labor, and which accordingly is then susceptible of low prices of sale to the consuming public, thereby making such lock down devices economically available to the buying public.

Still yet another object of the present invention is to provide a new and improved trailer lock down device which provides in the apparatuses and methods of the prior art some of the advantages thereof, while simultaneously overcoming some of the disadvantages normally associated therewith.

Still another object of the present invention is to provide a new and improved trailer lock down device for securing a trailer in a desired location when not in use.

Yet another object of the present invention is to provide a new and improved trailer lock down device for securing a trailer in a level orientation.

Even still another object of the present invention is to provide a new and improved trailer lock down device which includes a hydraulic jack for allowing convenient attachment of a trailer tongue on a towing vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
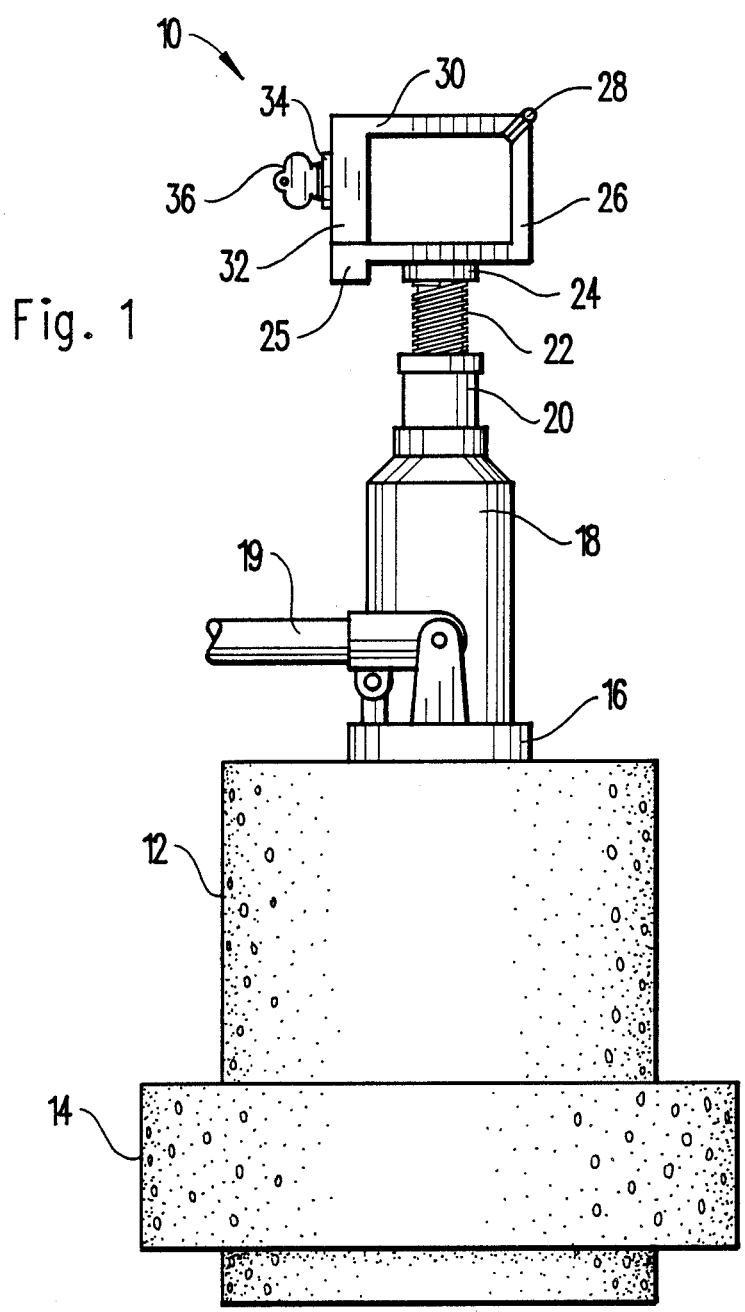
FIG. 1 is a side elevational view of the trailer lock down device according to the present invention.

With reference now to the drawings, and in particular to FIG. 1 thereof, a new and improved trailer lock down device embodying the principles and concepts of the present invention and generally designated by the reference numeral 10 will be described.

More specifically, it will be noted that the first embodiment 10 of the invention includes a base 16 which is secured on an upper surface of a concrete block 12. The concrete block 12 may include an enlarged width portion 14 to enhance securement of the block 12 in the ground at a selected location. It should be understood that the block 12 may be formed by an insitu pouring of concrete. A conventional hydraulic bottle jack 18 includes a vertically extensible and retractable shaft 20 which is actuated by a manual pump handle 19. A threaded extension member 22 is telescopically received within a free upper end of the shaft 20 and terminates at a cylindrical disk 24. The constructional details of the hydraulic jack 18 are conventional, and may be of the type utilized in a conventional vehicle bottle jack. A first L-shaped member 26 has a bottom portion 25 which is secured to the disk 24, for example by welding. A second L-shaped member includes a top leg 30 secured by a hinge 28 and movable between an open position and the illustrated closed position in which an open ended rectangular box is formed. A second leg 32 of the second L-shaped member is provided with a key actuated locking cylinder 34 which secures the leg portion 32 of the second L-shaped member to the bottom leg portion 25 of the first L-shaped member. A conventional key 36 is provided for actuating the locking cylinder 34. In use, the locking cylinder 34 is unlocked using the key 36 and the second L-shaped member 32, 30 is pivoted to an open position. An elongated portion of a trailer tongue is received within the first L-shaped member 25, 26 and the shaft 20 and extension 22 are then adjusted until the bottom leg member 25 abuts the bottom of the trailer tongue. The second L-shaped member 32, 30 is then pivoted to a closed position and the locking cylinder 34 is then utilized to lock the two L-shaped members in the illustrated closed position to secure the trailer tongue in a level orientation. The jack 18 may be first adjusted to retract the shaft 20 and the extension member 22 to allow the trailer tongue to be driven over the L-shaped leg portion 25. The use of the jack 18 allows convenient disengagement of the trailer hitch socket from the hitch ball of the towing vehicle and may additionally be utilized to level a trailer in a parked position.

Figure 2:
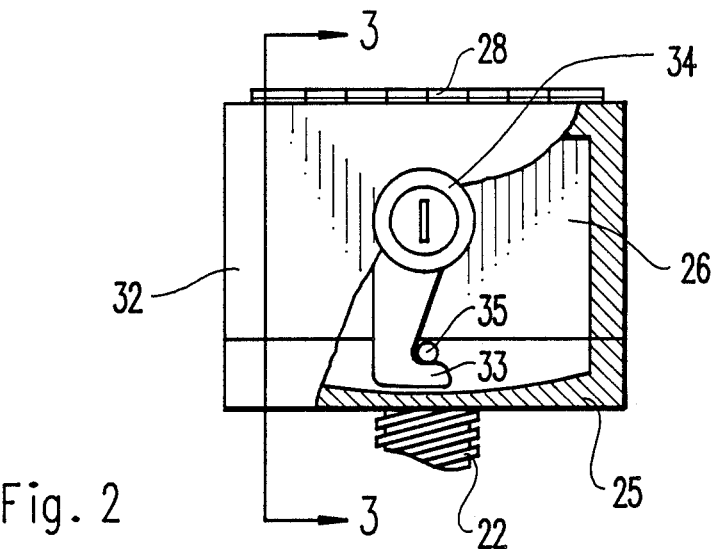
FIG. 2 is a detail view, partially in cross section, illustrating the trailer tongue locking device.

FIG. 2 illustrates the details of the locking mechanism. A stationary locking pin 35 is received within a slot formed in the lower leg member 25. A pivotal hook member 33 is configured to engage the pin 35 when the locking cylinder 34 is in a locked position.

Figure 3:
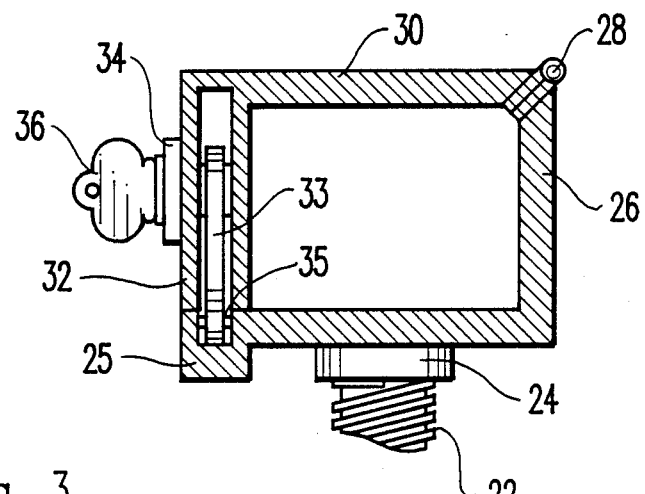
FIG. 3 is a cross sectional view, taken along line 3—3 of FIG. 2.

FIG. 3 is a cross sectional view, which further illustrates the hook member 33 in locking engagement with the pin 35. In use, the tongue of the trailer extends through the interior of the open ended box and is retained therein by virtue of the enlarged dimensions of the trailer tongue hitch ball engaging socket. The use of the illustrated box configuration to engage the trailer hitch tongue allows the jack mechanism to be utilized to disengage the tongue from the vehicle hitch ball. In contrast to trailer locking devices which utilizes a ball-shaped member insertable within the trailer hitch ball socket, this allows convenient removal and connection of the trailer tongue to a towing vehicle.

Figure 4:
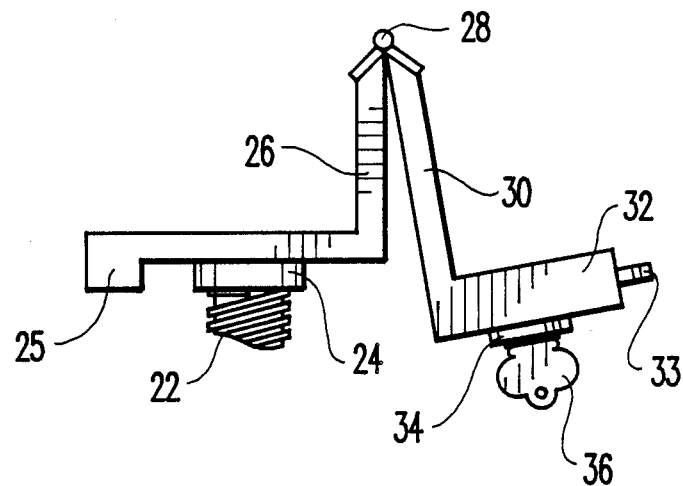
FIG. 4 is a partial side view illustrating the trailer tongue locking mechanism in an open position.

FIG. 4 is a side view which illustrates the locking mechanism in an open position.

Figure 5:
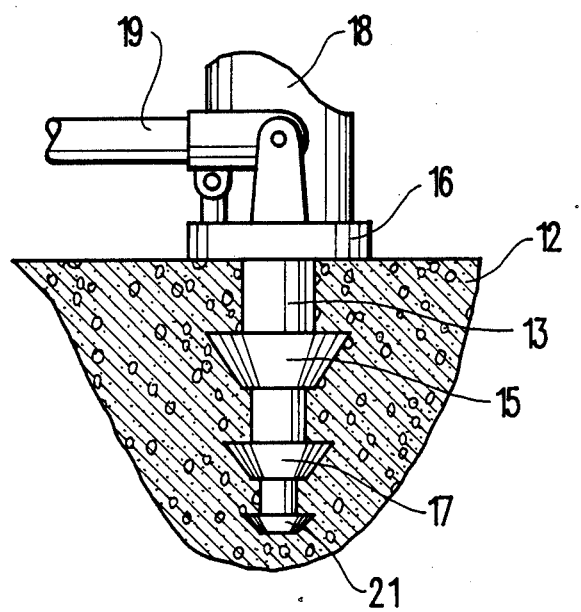
FIG. 5 is a detail view, partially cut away, illustrating the ground insertion anchor of the trailer lock down device of the present invention.

FIG. 5 illustrates a ground insertion anchor 13 which is formed as an elongated rod which extends downwardly from the base 16. The ground insertion anchor 13 includes a pluralitY of stepped diameter radially extending flanges 15, 17 and 21 which serve to enhance securement of the base 16 within the concrete block 12. As discussed previously, the concrete block 12 is preferably formed by an in-situ concrete pour to secure the base 16 at an intended trailer locking location. As may now be understood, the trailer lock down device of the present invention allows the tongue of a trailer to be driven over the locking device and supported through the use of a hydraulic jack, without requiring any manual lifting of the trailer tongue. This minimizes the potential for serious back injury to a user, and additionally allows trailers to be secured in a level orientation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer lock down device, comprising:
   a base;
   a ground insertion anchor on said base for securing said base at an intended location;
   said ground insertion anchor including an elongated rod provided with a plurality of axially spaced radially extending flanges adapted for encapsulation in a concrete block;
   a hydraulic jack on said base;
   a shaft mounted for selective vertical extension and retraction by said jack;
   a threaded extension member telescopically received in coaxial relation in a free upper end of said shaft;
   a first L-shaped member secured to a free upper end of said extension member;
   a second L-shaped member secured to by a hinge to said first L-shaped member, said second L-shaped member movable to a closed position, wherein said first and second members form an open ended box; and
   a key actuated locking mechanism for securing said second L-shaped member in said closed position.

* * * * *